May 21, 1968

D. F. GIBSON 3,383,979

COLORIMETER PROBE

Filed March 24, 1964

INVENTOR.
DONALD F. GIBSON

BY
ATTORNEYS

May 21, 1968  D. F. GIBSON  3,383,979
COLORIMETER PROBE
Filed March 24, 1964  2 Sheets-Sheet 2
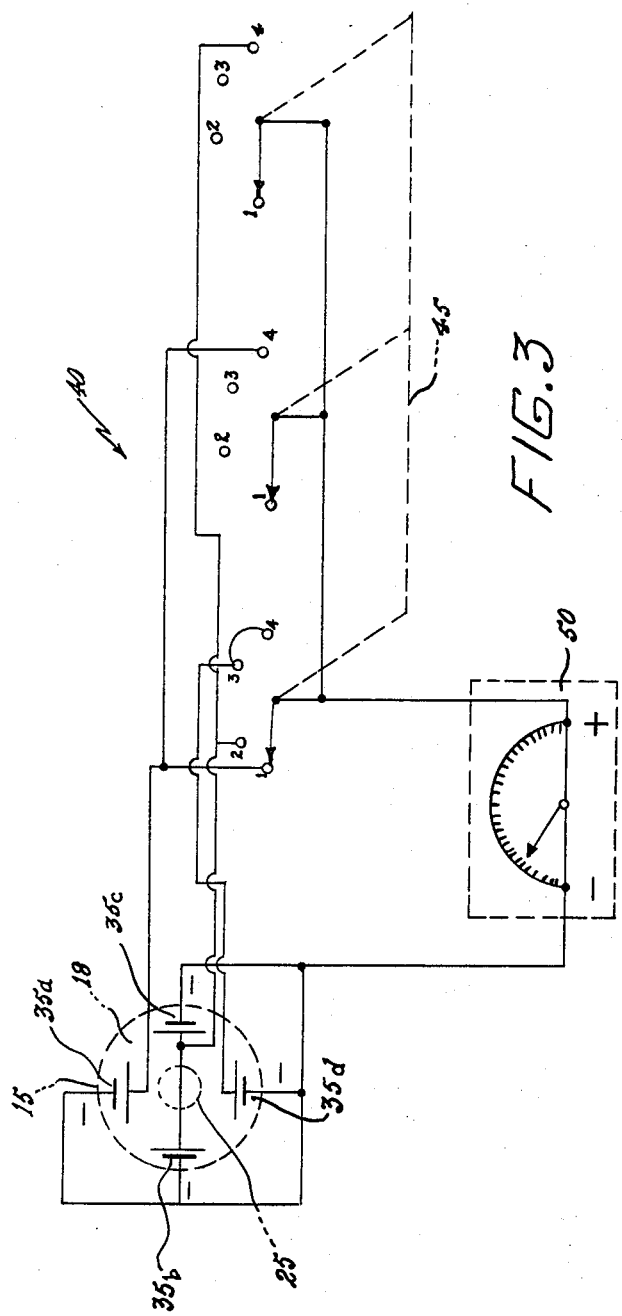
INVENTOR.
DONALD F. GIBSON
BY
ATTORNEYS

ABSTRACT OF THE DISCLOSURE

A miniature probe for measuring the color and light intensity of a subject. The probe has an opaque outer surface and an elongated cylinder which houses a light source, light guide and the photovoltaic cell and which can be held in one's hand during the operation thereof.

---

The invention described herein may be manufactured and used by or for the United States Government for governmental purposes without payment to me of any royalty thereon.

This invention pertains generally to instruments for measuring and comparing color, and in particular, to a miniature probe therefor.

Measurements and comparisons of color naturally will vary with different light sources. Heretofore, colorimeters required the test subject to be placed in a space where the light source could be controlled. This may not always be convenient nor possible, and therefore, it is desirable to have a portable device capable of accurate color testing in the presence of environmental light without regard thereof.

Thus, it is an object of this invention to perform accurate color tests on a subject without regard to environmental light thereabouts.

It is an object of this invention to provide a compact and portable colorimeter.

Another object is to provide a miniature and portable probe for colorimeters.

A further object is to provide a colorimeter probe that is convenient and simple to use and which is capable of yielding individual readings as well as a composite reading for separate areas of the test subject.

It is still another object of the invention to provide a colorimeter probe which is economical to produce and which utilizes conventional, currently available components that lend themselves to standard mass production manufacturing techniques.

Other objects and a fuller understanding of the invention may be had by referring to the following description and claims taken in conjunction with the accompanying drawings, in which:

FIGURE 3 is a simplified circuit diagram for the invented probe.

Figure 1:
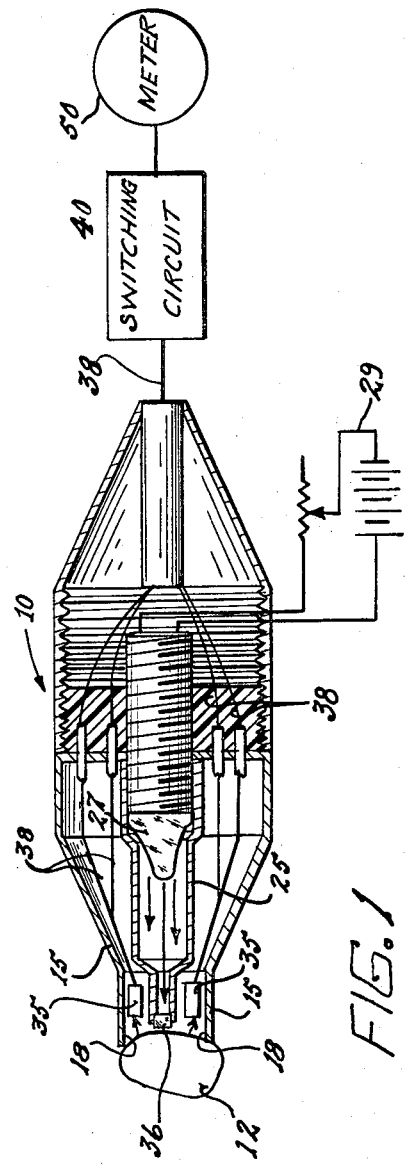
FIGURE 1 is a schematic cross-section of the invented colorimeter probe.

With reference to the figures, wherein like numerals refer to like parts, the probe 10 is generally an elongated cylinder enabling it to be held in the hand against a test subject 12. As illustrated, the cylinder includes an opaque outer surface 15 which tapers to the test port 18 at one end of the probe 10. Port 18 admits the passage of light axially into the probe 10, however, notice that port 18 is enclosed from external light by surface 15 and subject 12 whenever the probe 10 is held against a test subject 12 as shown in FIGURE 1. Port 18 is shown as circular in shape, however, other shapes and sizes may be employed to accommodate a specific subject. For example, a form fitting rectangular shape may be utilized for color testing of human teeth.

A light guide is provided within probe 10 by an opaque tubular surface 25. The light guide is concentrically positioned within probe 10 and leads to the center of port 18. As shown, tubular surface 25 may be a series of tubular surfaces decreasing in diameter toward port 18, to provide a light source thereat smaller than the port 18.

A controlled source of light is provided within the light guide by bulb 27 and an adjustable current supply 29, utilizing conventional circuitry and available components.

Photovoltaic cells 35 are of known sensitive type, and sufficiently miniature for placement within probe 10 proximate the port 18. As illustrated in FIGURE 3, the cells 35 are affixed symmetrically around the light guide between the opaque surfaces 15, 25, at a position to receive reflections from subject 12, the opaque surfaces screening out all extraneous light. A tristimulus filter 36 is inserted into the light guide to be between the bulb 27 and port 18.

Figure 2:
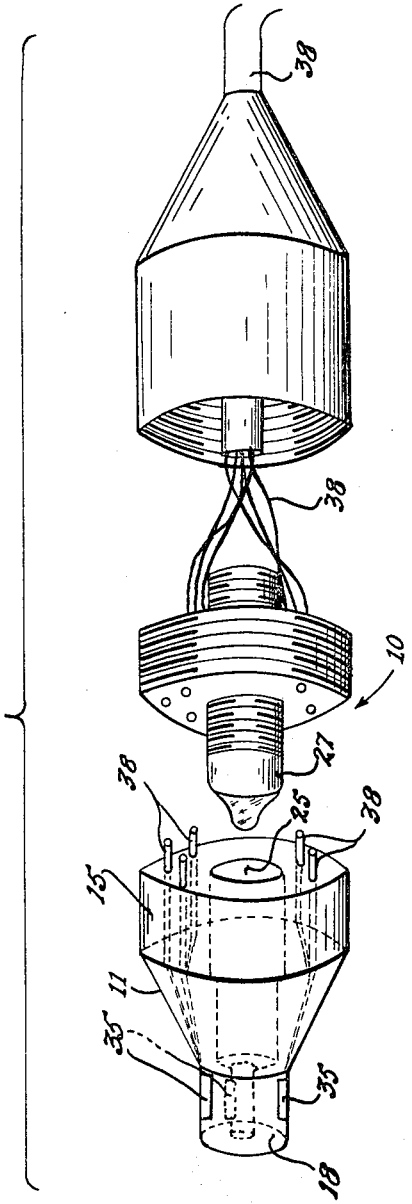
FIGURE 2 is an exploded perspective representation of FIGURE 1.

As indicated at FIGURE 2, the probe may have a separate nose block 11 constructed of a transparent material, such as glass or a clear plastic. In this case, the cells 35 and leads 38 are cast within the block 11 to firmly affix them in position. The block 11 is appropriately shaped and bored therethrough to provide a light guide. The opaque surfaces 15 and 25 may be provided by a covering film such as an opaque paint or by other well-known methods.

Suitable wires 38 connect the cells 35 to a switching circuit 40, leading to the external current measuring indicator 50. It is preferable that leads 38 be flexible for portions outside the probe 10. For purposes of illustration, a simplified switching circuit is shown in FIGURE 3, including a conventional indicating meter 50 and multi-position switch 45.

During a test, the probe 10 is held against a subject 12, and no consideration need be given to the external light thereabouts. In the case of a liquid or powder subject 12, the probe 10 is immersed into the subject. Light travels from bulb 27, in direction of arrows, to the subject 12. Cells 35 receive light reflections from subject 12 and produce a proportional current output which registers on meter 50. With switch 45 in position 1, only cell 35a is activated, and a reading will register for only that area of subject 12 opposite cell 35a. Positions 2 and 3 activate cells 35b, 35c and 35d, respectively, for readings of respective opposite areas. Position 4 yields a composite reading with all the cells activated. The relative percentage present of the three primary colors may be measured by insertion of standard tristimulus filters 36 and the readings thereof recorded.

Although the invention has been described with reference to a particular embodiment, it will be understood to those skilled in the art that the invention is capable of a variety of alternative embodiments within the spirit and scope of the appended claims.

I claim:

1. A miniature probe for measuring color and light intensity of a subject, comprising: an elongated cylinder including an opaque outer surface and having a test port at one end to be held against said subject, said outer surface and subject enclosing said port from external light; a light guide concentrically within said cylinder formed by an opaque tubular surface leading to said port; a light source within said guide directing light to said port; a photovoltaic cell affixed within said cylinder proximate said port and without said guide in position between said opaque outer and tubular surfaces to receive only reflections of said source from said subject, said opaque surfaces screening extraneous light therefrom; and flexible electrical leads extending from said cylinder to connect said cell to an indicating meter.

2. The invention according to claim 1 wherein said light guide is formed by a series of tubular surfaces, decreasing in diameter toward said port.

3. A miniature probe for measuring color and light intensity of a subject, comprising: an elongated cylinder including an opaque outer surface tapering to a test port at one end to be held against said subject, said port shaped to accommodate said subject, and said outer surface and subject enclosing said port from external light; a light guide concentrically within said cylinder formed by an opaque tubular surface leading to center of said port; a controlled light source within said guide directing light to said port center; a plurality of photovoltaic cells affixed within said cylinder proximate said port and symmetrically around said guide in position between said opaque outer and tubular surfaces to receive only reflections of said source from said subject, said opaque surfaces screening extraneous light therefrom; switching means to enable said cells to act singularly and jointly, as desired; and flexible electrical leads extending from said cylinder to connect said cells and switching means to a current measuring indicator.

4. The invention according to claim 3 having a tristimulus filter insert within said guide between said light source and port.

References Cited
UNITED STATES PATENTS

| | | | |
|---|---|---|---|
| 2,269,813 | 1/1942 | Garity et al. | 88—14 |
| 2,406,166 | 8/1946 | Scott | 88—14 |
| 2,420,716 | 5/1947 | Morton et al. | 250—227 |
| 2,710,924 | 6/1955 | Morrison et al. | 88—14 |
| 2,936,886 | 5/1960 | Harmon | 88—14 |
| 3,130,317 | 4/1964 | Connelly et al. | 250—227 |
| 3,305,689 | 2/1967 | Leavy, et al. | 250—227 |
| 3,306,157 | 2/1967 | Hach | 88—14 |
| 2,843,112 | 7/1958 | Miller | 88—14 |
| 3,327,583 | 6/1967 | Vanderschmidt et al. | 88—14 |

JEWELL H. PEDERSEN, *Primary Examiner.*

W. A. SKLAR, *Assistant Examiner.*